(12) United States Patent
Peng et al.

(10) Patent No.: US 11,109,240 B2
(45) Date of Patent: Aug. 31, 2021

(54) COMPONENT CARRIER GROUPING METHOD AND DEVICE

(71) Applicant: Huawei Technologies Co., Ltd., Shenzhen (CN)

(72) Inventors: Jinlin Peng, Shanghai (CN); Fan Wang, Shanghai (CN); Hao Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 27 days.

(21) Appl. No.: 16/567,694

(22) Filed: Sep. 11, 2019

(65) Prior Publication Data

US 2020/0008076 A1    Jan. 2, 2020

Related U.S. Application Data

(63) Continuation of application No. PCT/CN2018/090894, filed on Jun. 12, 2018.

(30) Foreign Application Priority Data

Jun. 16, 2017    (CN) .......................... 201710459133.9

(51) Int. Cl.
*H04W 16/14*    (2009.01)
*H04L 5/00*    (2006.01)
(Continued)

(52) U.S. Cl.
CPC ............ *H04W 16/14* (2013.01); *H04L 5/001* (2013.01); *H04L 27/2666* (2013.01); *H04W 8/18* (2013.01); *H04W 72/048* (2013.01)

(58) Field of Classification Search
CPC ..... H04W 16/14; H04W 8/18; H04W 72/048; H04W 24/10; H04W 16/28; H04W 88/02;
(Continued)

(56) References Cited

U.S. PATENT DOCUMENTS 9,065,619 B2 *  6/2015  Han ..................... H04L 1/1854
2010/0272048 A1  10/2010  Pan et al.
(Continued)

FOREIGN PATENT DOCUMENTS

CN    101841398 A    9/2010
CN    103905165 A    7/2014
(Continued)

OTHER PUBLICATIONS

"On Decoupling DL and UL for CA/DC," Agenda Item: 8.1.3.4, Source: Huawei, HiSilicon, Document for: Discussion and Decision, 3GPP TSG RAN WG1 Meeting #88bis, R1-1705062, Apr. 3-7, 2017, 4 pages.

(Continued)

*Primary Examiner* — Hanh N Nguyen
(74) *Attorney, Agent, or Firm* — Slater Matsil, LLP

(57) ABSTRACT

A component carrier grouping method and a device are provided. The method includes: grouping, by a network device, a plurality of component carriers configured for a terminal into at least one component carrier group of a first type, the terminal aggregates feedback information corresponding to the plurality of component carriers and feeds back the aggregated feedback information to the network device over one component carrier; and sending, by the network device, first grouping configuration information to the terminal.

16 Claims, 9 Drawing Sheets

(51) Int. Cl.
*H04L 27/26* (2006.01)
*H04W 8/18* (2009.01)
*H04W 72/04* (2009.01)

(58) Field of Classification Search
CPC .... H04W 88/08; H04L 27/2666; H04L 5/001; H04L 1/18; H04L 1/16; H04L 5/0055; H04L 1/0026; H04L 1/0073; H04L 1/1671; H04L 1/1893; H04L 5/0053
See application file for complete search history.

(56) References Cited

U.S. PATENT DOCUMENTS

| | | | | |
|---|---|---|---|---|
| 2013/0114575 | A1* | 5/2013 | Fu | H04L 5/0053 370/336 |
| 2015/0092634 | A1 | 4/2015 | Yin et al. | |
| 2015/0333871 | A1 | 11/2015 | Lin et al. | |
| 2017/0366994 | A1* | 12/2017 | Akkarakaran | H04B 7/0617 |

FOREIGN PATENT DOCUMENTS

| | | |
|---|---|---|
| CN | 104426637 A | 3/2015 |
| CN | 105991249 A | 10/2016 |
| CN | 105991260 A | 10/2016 |
| CN | 106470093 A | 3/2017 |
| EP | 2408247 A1 | 1/2012 |
| EP | 2941073 A1 | 11/2015 |
| EP | 3070870 A1 | 9/2016 |
| WO | 2013181829 A1 | 12/2013 |
| WO | 2016189766 A1 | 12/2016 |

OTHER PUBLICATIONS

"Improvements on Control Channel for Carrier Aggregation," Agenda Item: 15.4, Source: Huawei, Document for: Discussion, 3GPP TSG RAN WG1 Meeting #58 , R1-093048, Aug. 24-28, 2009, 4 pages.

* cited by examiner

Group 1: Component carrier group of a second type

Primary component carrier

COMPONENT CARRIER GROUPING METHOD AND DEVICE

CROSS-REFERENCE TO RELATED APPLICATIONS

This application is a continuation of International Application No. PCT/CN2018/090894, filed on Jun. 12, 2018, which claims priority to Chinese Patent Application No. 201710459133.9, filed on Jun. 16, 2017. The disclosures of the aforementioned applications are hereby incorporated by reference in their entireties.

TECHNICAL FIELD

This application relates to the field of wireless communications technologies, and in particular, to a component carrier grouping method and a device.

BACKGROUND

To better satisfy increasing service type requirements, a new access technology (for example, a 5G technology) needs to support enhanced mobile broadband (eMBB) and a broadcast service that are supported in long term evolution (LTE), and two new service types: ultra-reliable and low-latency communications (URLLC) and massive machine type communications (mMTC), are also additionally introduced. Service characteristics, reliable requirements, or latency requirements of the service types are obviously different. Therefore, the services have different requirements on system parameters such as a subcarrier spacing, a symbol length, and a time unit. In addition, 5G supports frequency bands of sub 6 GHz (for example, 700 MHz or 3.5 GHz) and above 6 GHz (for example, 28 GHz or 40 GHz), and different system parameters such as subcarrier spacings, symbol lengths, and time units also need to be correspondingly configured for different frequency bands. To introduce a new service type and support more frequency bands, in a new radio (NR) design, flexible configurations of system parameters such as a component carrier spacing, a symbol length, and a time unit are considered.

In an existing long term evolution-advanced (LTE-Advanced, LTE-A) system, the 3rd Generation Partnership Project (3GPP) proposes a component carrier aggregation technology. According to the component carrier aggregation technology, a plurality of component carriers can be well aggregated into a wider spectrum, and some non-contiguous spectrums can also be aggregated together. In the existing technology, a component carrier grouping is determined according to a hybrid automatic repeat request-acknowledgment (HARQ-ACK) principle or a physical uplink control channel (PUCCH) principle. To be specific, in a current component carrier grouping, for data transmitted in a time unit of one component carrier, a decoding result of the data may be fed back in a time unit of another component carrier. For example, if the decoding is correct, an acknowledgement (ACK) is fed back; otherwise, a negative acknowledgement (NACK) is fed back. To be specific, cross-component carrier feedback can be implemented in the current component carrier grouping, and the current component carrier grouping is a component carrier group grouped based on the cross-component carrier feedback. In addition, to support flexible scheduling, the concept of cross-component carrier scheduling is further introduced in LTE-A. To be specific, in a current component carrier grouping, in a time unit of a component carrier, a time unit of another component carrier can be scheduled through cross-component carrier scheduling. For example, as shown in FIG. 1, a physical downlink control channel (PDCCH) corresponding to a physical downlink shared channel (PDSCH)/physical uplink shared channel (PUSCH) of one component carrier may be carried over another component carrier. However, in LTE/LTE-A, time units used for aggregated component carriers are the same and are all 1 ms. However, in NR, time units used for aggregated component carriers may be different. For example, as shown in FIG. 2, a component carrier 1 has a subframe length of 0.5 ms, and a component carrier 2 has a subframe length of 0.125 ms. In addition, system parameters such as a component carrier spacing, a symbol length, and a time unit are flexibly configured in NR. Specifically, in a 5G NR system, a component carrier configuration parameter (numerology) of a component carrier may include a subcarrier spacing, a time unit length, a CP type, and the like.

In this case, if cross-component carrier scheduling is still performed by using an existing method, in addition to a fact that the cross-component carrier scheduling is limited in a component carrier group grouped based on cross-component carrier feedback, the cross-component carrier scheduling in the current component carrier grouping further affects a maximum quantity of HARQ processes, a timing value indication complexity, and complexity of blind detection performed by a terminal. In addition, there is a specific requirement on a capability of the terminal.

SUMMARY

Embodiments of this application provide a component carrier grouping method and a device, and a component carrier aggregation and feedback method and a device, to resolve a problem that cross-component carrier scheduling is relatively complex.

According to a first aspect, an embodiment of this application provides a component carrier grouping method. The method includes grouping, by a network device, a plurality of component carriers configured for a terminal into at least one component carrier group of a first type, so that the network device sends control information corresponding to a first component carrier to the terminal over a second component carrier, where the first component carrier and the second component carrier belong to a same component carrier group of the first type, and when a plurality of component carriers in at least two component carrier groups of the first type are scheduled, the terminal aggregates feedback information corresponding to the plurality of component carriers and feeds back the aggregated feedback information to the network device over one component carrier. The method also includes sending, by the network device, first grouping configuration information to the terminal, where the first grouping configuration information is used to indicate a grouping result of the at least one component carrier group of the first type.

According to the foregoing method, the network device groups the component carriers configured for the terminal into the at least one component carrier group of the first type, and a component carrier group grouped based on cross-component carrier feedback and a component carrier group grouped based on cross-component carrier scheduling are decoupled, so that component carrier aggregation scheduling performed by the network device under aggregation of component carriers including different numerologies can be simplified, a quantity of required processes can be reduced, timing value indication complexity can be reduced, and blind detection overheads can be reduced. In addition, the terminal can aggregate the feedback information corresponding to the component carriers in the at least two component carrier groups of the first type, and feed back the aggregated feedback information over a same component carrier. Therefore, a limitation on a terminal power can further be avoided.

It should be understood that the network device cannot perform cross-component carrier scheduling between two component carrier groups of the first type.

In a possible design, before the network device groups the plurality of component carriers configured for the terminal into the at least one component carrier group of the first type, the network device receives information about a first capability that is reported by the terminal, and the information about the first capability is used to notify the network device that the terminal supports carrying of the control information corresponding to the first component carrier on the second component carrier.

According to the foregoing method, the network device may determine, based on the information about the first capability that is reported by the terminal, that the terminal can support the cross-component carrier scheduling, and then group the plurality of component carriers configured for the terminal into the at least one component carrier group of the first type.

In a possible design, at least two component carriers included in the component carrier group of the first type have a same subcarrier spacing or time unit length.

According to the foregoing method, the network device groups, by using the same subcarrier spacing or the same time unit length as a grouping criterion, the plurality of component carriers configured for the terminal into the at least one component carrier group of the first type. Therefore, cross-component carrier scheduling complexity can be greatly reduced in the grouping manner. In addition, the network device further ensures, in the grouping manner, that a maximum of one component carrier group of the first type has component carriers having different subcarrier spacings or different time unit lengths. For example, the network device may first group, by using the same subcarrier spacing or the same time unit length as the grouping criterion, the plurality of component carriers configured for the terminal into the at least one component carrier group of the first type, and then use a remaining component carrier as one component carrier group of the first type.

Alternatively, at least two component carriers included in the component carrier group of the first type have a maximum of two different subcarrier spacing or time unit length configurations.

According to the foregoing method, component carriers allocated by the network device to each component carrier group of the first type have a maximum of two different subcarrier spacing or time unit length configurations, to reduce the cross-component carrier scheduling complexity, thereby avoiding relatively high cross-component carrier scheduling complexity caused by excessively many types of subcarrier spacing or time unit length configurations in the component carrier group.

Further optionally, component carriers included in one component carrier group of the first type have a maximum of two different subcarrier spacing or time unit length configurations, and two different subcarrier spacings or time unit lengths are two neighboring component carrier spacings or time unit lengths that are supported by the terminal or a system.

In a possible design, component carriers included in one component carrier group of the first type have a maximum of two different subcarrier spacing or time unit length configurations. This grouping manner is easier.

It should be understood that the grouping, by a network device, a plurality of component carriers configured for a terminal into at least one component carrier group of a first type may be that each component carrier configured for the terminal is grouped into one component carrier group of the first type; or some component carriers configured for the terminal are grouped into at least one component carrier group of the first type, and a remaining component carrier configured for the terminal does not belong to any component carrier group of the first type.

In a possible design, the information about the first capability is further used to indicate a difference between a component carrier configuration parameter of the first component carrier and a component carrier configuration parameter of the second component carrier that are supported by the terminal. In this case, the network device groups, based on the information about the first capability, the plurality of component carriers configured for the terminal into the at least one component carrier group of the first type.

According to the foregoing method, the network device may group, based on the specific capability, the plurality of component carriers configured for the terminal into the at least one component carrier group of the first type, so that the at least one grouped component carrier group of the first type is more targeted, and can be supported by the terminal.

In addition, the information about the first capability may further include whether the terminal supports the cross-component carrier feedback.

In a possible design, the network device groups a plurality of component carriers configured for the terminal into at least one component carrier group of a second type, so that the terminal sends feedback information corresponding to each component carrier in each component carrier group of the second type to the network device over a primary component carrier or one component carrier in the component carrier group of the second type. The network device sends second grouping configuration information to the terminal, and the second grouping configuration information is used to indicate a grouping result of the at least one component carrier group of the second type.

According to the foregoing method, the network device groups the component carriers configured for the terminal into the at least one component carrier group of the second type, so that the terminal may send the feedback information corresponding to each component carrier in each component carrier group of the second type to the network device over the primary component carrier or the one component carrier in the component carrier group of the second type. Therefore, the limitation on the terminal power can be avoided.

In a possible design, there is an intersection set between each component carrier group of the first type and at least one component carrier group of the second type. For example, the component carrier group of the first type is a subset of one component carrier group of the second type. For another example, there are intersection sets between the component carrier group of the first type and two component carrier groups of the second type, to be specific, the component carrier group of the first type and the two component carrier groups of the second type have partially overlapping component carriers.

According to the foregoing method, the component carrier group grouped based on the cross-component carrier feedback and the component carrier group grouped based on the cross-component carrier scheduling may be partially decoupled or completely decoupled.

In a possible design, when one component carrier group of the second type includes a plurality of component carrier groups of the first type, and at least two component carriers in the plurality of component carrier groups of the first type are scheduled, the network device receives aggregated feedback information corresponding to the at least two component carriers over a primary component carrier or one component carrier in the component carrier group of the second type, where the aggregated feedback information is feedback information fed back by the terminal to the network device after the terminal aggregates feedback information corresponding to the at least two component carriers.

According to the foregoing method, the network device groups the component carriers configured for the terminal into the at least one component carrier group of the second type, and when one component carrier group of the second type includes a plurality of component carrier groups of the first type, and at least two component carriers in the plurality of component carrier groups of the first type are scheduled, the terminal may aggregate feedback information corresponding to the at least two component carriers, and feed back the aggregated feedback information to the network device, thereby avoiding the limitation on the terminal power.

According to a second aspect, a component carrier grouping method includes receiving, by a terminal, first grouping configuration information sent by a network device, where the first grouping configuration information is used to indicate a grouping result of at least one component carrier group of a first type. The method also includes receiving, by the terminal, control information corresponding to a first component carrier that is sent by the network device over a second component carrier, where the first component carrier and the second component carrier belong to a same component carrier group of the first type, and/or when a plurality of component carriers in at least two component carrier groups of the first type are scheduled, the terminal aggregates feedback information corresponding to the plurality of component carriers and feeds back the aggregated feedback information to the network device over one component carrier.

According to the foregoing method, the terminal receives the first grouping configuration information sent by the network device, and a component carrier group grouped based on cross-component carrier feedback and a component carrier group grouped based on cross-component carrier scheduling are decoupled, so that component carrier aggregation scheduling performed by the network device under aggregation of component carriers including different numerologies can be simplified, a quantity of required processes can be reduced, timing value indication complexity can be reduced, and blind detection overheads can be reduced. In addition, the terminal can aggregate the feedback information corresponding to the component carriers in the at least two component carrier groups of the first type, and feed back the aggregated feedback information over a same component carrier. Therefore, a limitation on a terminal power can be avoided.

In a possible design, before the terminal receives the first grouping configuration information sent by the network device, the terminal reports information about a first capability to the network device, and the information about the first capability is used to notify the network device that the terminal supports carrying of the control information corresponding to the first component carrier on the second component carrier.

According to the method, the network device may determine, based on the information about the first capability that is reported by the terminal, that the terminal can support the cross-component carrier scheduling, and then group the plurality of component carriers configured for the terminal into the at least one component carrier group of the first type.

In a possible design, at least two component carriers included in the component carrier group of the first type have a same subcarrier spacing or time unit length.

According to the foregoing method, the network device groups, by using the same subcarrier spacing or the same time unit length as a grouping criterion, the plurality of component carriers configured for the terminal into the at least one component carrier group of the first type. Therefore, cross-component carrier scheduling complexity can be greatly reduced in the grouping manner.

Alternatively, at least two component carriers included in the component carrier group of the first type have a maximum of two different subcarrier spacing or time unit length configurations.

According to the foregoing method, component carriers allocated by the network device to each component carrier group of the first type have a maximum of two different subcarrier spacing or time unit length configurations, to reduce the cross-component carrier scheduling complexity, thereby avoiding relatively high cross-component carrier scheduling complexity caused by excessively many types of subcarrier spacing or time unit length configurations in the component carrier group.

In a possible design, the information about the first capability is further used to indicate a difference between a component carrier configuration parameter of the first component carrier and a component carrier configuration parameter of the second component carrier that are supported by the terminal.

According to the foregoing method, the network device may group, based on the specific capability, the plurality of component carriers configured for the terminal into the at least one component carrier group of the first type, so that the at least one grouped component carrier group of the first type is more targeted, and can be supported by the terminal.

In a possible design, the terminal receives second grouping configuration information sent by the network device, and the second grouping configuration information is used to indicate a grouping result of at least one component carrier group of a second type. The terminal sends feedback information corresponding to each component carrier in each component carrier group of the second type to the network device over a primary component carrier or one component carrier in the component carrier group of the second type.

According to the foregoing method, the terminal receives the second grouping configuration information sent by the network device, and the terminal may send the feedback information corresponding to each component carrier in each component carrier group of the second type to the network device over the primary component carrier or the one component carrier in the component carrier group of the second type. Therefore, the limitation on the terminal power can be avoided.

In a possible design, there is an intersection set between each component carrier group of the first type and at least one component carrier group of the second type. For example, the component carrier group of the first type is a subset of one component carrier group of the second type.

For another example, there are intersection sets between the component carrier group of the first type and two component carrier groups of the second type, to be specific, the component carrier group of the first type and the two component carrier groups of the second type have partially overlapping component carriers.

According to the foregoing method, the component carrier group grouped based on the cross-component carrier feedback and the component carrier group grouped based on the cross-component carrier scheduling may be partially decoupled or completely decoupled.

In a possible design, when one component carrier group of the second type includes a plurality of component carrier groups of the first type, and at least two component carriers in the plurality of component carrier groups of the first type are scheduled, the terminal sends aggregated feedback information corresponding to the at least two component carriers to the network device over a primary component carrier or one component carrier in the component carrier group of the second type, where the aggregated feedback information is feedback information fed back by the terminal to the network device after the terminal aggregates feedback information corresponding to the at least two component carriers.

According to the foregoing method, the network device groups the component carriers configured for the terminal into the at least one component carrier group of the second type , when one component carrier group of the second type includes a plurality of component carrier groups of the first type, and at least two component carriers in the plurality of component carrier groups of the first type are scheduled, the terminal may aggregate feedback information corresponding to the at least two component carriers, and feed back the aggregated feedback information to the network device, thereby avoiding the limitation on the terminal power.

According to a third aspect, an embodiment of this application further provides a network device. For example, the network device may be a base station, and the network device has a function of implementing a behavior of the network device in the foregoing method example. The function may be implemented by using hardware, or may be implemented by hardware executing corresponding software. The hardware or software includes one or more modules corresponding to the foregoing function.

In a possible design, a structure of the network device includes a processing unit and a transceiver unit. These units can perform corresponding functions in the foregoing method example. For details, refer to the detailed descriptions in the method example, and details are not described herein again.

In a possible design, the structure of the network device includes a processor, a transmitter, and a receiver. The transmitter and the receiver are configured to communicate and interact with a terminal, and the processor is configured to support the network device in performing a corresponding function in the foregoing method. The network device may further include a memory. The memory is coupled to the processor and stores a program instruction and data that are necessary to the network device.

When the instruction stored in the memory is executed, the processor groups a plurality of component carriers configured for a terminal into at least one component carrier group of a first type, so that a transceiver sends control information corresponding to a first component carrier to the terminal over a second component carrier, where the first component carrier and the second component carrier belong to a same component carrier group of the first type, and when a plurality of component carriers in at least two component carrier groups of the first type are scheduled, the terminal aggregates feedback information corresponding to the plurality of component carriers and feeds back the aggregated feedback information to the network device over one component carrier; and the transmitter sends first grouping configuration information to the terminal, where the first grouping configuration information is used to indicate a grouping result of the at least one component carrier group of the first type.

In a possible design, before the processor groups the plurality of component carriers configured for the terminal into the at least one component carrier group of the first type, the receiver receives information about a first capability that is reported by the terminal, and the information about the first capability is used to notify the network device that the terminal supports carrying of the control information corresponding to the first component carrier on the second component carrier.

In a possible design, at least two component carriers included in the component carrier group of the first type have a same subcarrier spacing or time unit length; or at least two component carriers included in the component carrier group of the first type have a maximum of two different subcarrier spacing or time unit length configurations.

In a possible design, the information about the first capability is further used to indicate a difference between a component carrier configuration parameter of the first component carrier and a component carrier configuration parameter of the second component carrier that are supported by the terminal.

The processor groups, based on the information about the first capability, the plurality of component carriers configured for the terminal into the at least one component carrier group of the first type.

In a possible design, the processor further groups a plurality of component carriers configured for the terminal into at least one component carrier group of a second type, so that the terminal sends feedback information corresponding to each component carrier in each component carrier group of the second type to the network device over a primary component carrier or one component carrier in the component carrier group of the second type; and the transmitter sends second grouping configuration information to the terminal, where the second grouping configuration information is used to indicate a grouping result of the at least one component carrier group of the second type.

In a possible design, there is an intersection set between each component carrier group of the first type and at least one component carrier group of the second type.

In a possible design, when one component carrier group of the second type includes a plurality of component carrier groups of the first type, and at least two component carriers in the plurality of component carrier groups of the first type are scheduled, the receiver further receives aggregated feedback information corresponding to the at least two component carriers over a primary component carrier or any component carrier in the component carrier group of the second type, where the aggregated feedback information is feedback information fed back by the terminal to the network device after the terminal aggregates feedback information corresponding to the at least two component carriers.

According to a fourth aspect, an embodiment of the present invention further provides a terminal, and the terminal has a function of implementing behaviors of the terminal in the foregoing method example. For example, the terminal may be UE. The function may be implemented by using hardware, or may be implemented by hardware executing corresponding software. The hardware or software includes one or more modules corresponding to the foregoing function.

In a possible design, a structure of the terminal includes a receiving unit and a sending unit. These units can perform corresponding functions in the foregoing method example. For details, refer to the detailed descriptions in the method example, and details are not described herein again.

In a possible design, the structure of the terminal includes a transmitter and a processor. The transmitter is configured to communicate and interact with a network device, and the processor is configured to support the terminal in performing a corresponding function in the foregoing method. The terminal may further include a memory, and the memory is coupled to the processor and stores a program instruction and data that are necessary to the terminal.

When the instruction stored in the memory is executed, the transceiver receives first grouping configuration information sent by a network device, where the first grouping configuration information is used to indicate a grouping result of at least one component carrier group of a first type; and the transceiver further receives control information corresponding to a first component carrier that is sent by the network device over a second component carrier, where the first component carrier and the second component carrier belong to a same component carrier group of the first type, and/or when a plurality of component carriers in at least two component carrier groups of the first type are scheduled, the transceiver is configured to: aggregate feedback information corresponding to the plurality of component carriers, and feed back the aggregated feedback information to the network device over one component carrier.

In a possible design, the transceiver further reports information about a first capability to the network device before receiving the first grouping configuration information sent by the network device, and the information about the first capability is used to notify the network device that the terminal supports carrying of the control information corresponding to the first component carrier on the second component carrier.

In a possible design, at least two component carriers included in the component carrier group of the first type have a same subcarrier spacing or time unit length; or at least two component carriers included in the component carrier group of the first type have a maximum of two different subcarrier spacing or time unit length configurations.

In a possible design, the information about the first capability is further used to indicate a difference between a component carrier configuration parameter of the first component carrier and a component carrier configuration parameter of the second component carrier that are supported by the terminal.

In a possible design, the transceiver further receives second grouping configuration information sent by the network device, and the second grouping configuration information is used to indicate a grouping result of at least one component carrier group of the second type; and the transceiver further sends feedback information corresponding to each component carrier in each component carrier group of the second type to the network device over a primary component carrier or any component carrier in the component carrier group of the second type.

In a possible design, there is an intersection set between each component carrier group of the first type and at least one component carrier group of the second type.

In a possible design, when one component carrier group of the second type includes a plurality of component carrier groups of the first type, and at least two component carriers in the plurality of component carrier groups of the first type are scheduled, the transceiver sends aggregated feedback information corresponding to the at least two component carriers to the network device over a primary component carrier or any component carrier in the component carrier group of the second type, where the aggregated feedback information is feedback information fed back by the processor to the network device by using the transceiver after the processor aggregates feedback information corresponding to the at least two component carriers.

According to a fifth aspect, an embodiment of this application further provides a communications system, and the communications system includes a network device and a terminal.

According to a sixth aspect, an embodiment of this application further provides a first non-transitory computer storage medium, the first non-transitory computer storage medium stores a computer-executable instruction, and the computer-executable instruction is used to perform the component carrier grouping method performed by the network device according to this application.

According to a seventh aspect, an embodiment of this application further provides a second non-transitory computer storage medium, the second non-transitory computer storage medium stores a computer-executable instruction, and the computer-executable instruction is used to perform the component carrier grouping method performed by the terminal according to this application.

According to an eighth aspect, an embodiment of this application further provides a first computer program product, the computer program product includes a computer program stored in the foregoing first non-transitory computer storage medium, the computer program includes a program instruction, and when the program instruction is executed by a computer, the computer is enabled to perform the component carrier grouping method according to this application.

According to a ninth aspect, an embodiment of this application further provides a second computer program product, the computer program product includes a computer program stored in the foregoing second non-transitory computer storage medium, the computer program includes a program instruction, and when the program instruction is executed by a computer, the computer is enabled to perform the component carrier grouping method according to this application.

According to a tenth aspect, an embodiment of this application further provides a component carrier aggregation and feedback method, including: in a scenario of aggregating component carriers including a plurality of component carrier configuration parameters numerologies, sending, by a network device, control information corresponding to a first component carrier to a terminal over a second component carrier, where the first component carrier and the second component carrier have a same numerology; and receiving, by the network device, aggregated feedback information, where the aggregated feedback information is information fed back by the terminal by aggregating feedback information corresponding to the component carriers including the plurality of numerologies and feeding back the aggregated feedback information by sharing one physical uplink control channel (PUCCH). According to the foregoing method, component carrier aggregation scheduling performed by the network device under aggregation of component carriers including different numerologies can be simplified, a quantity of required processes can be reduced, timing value indication complexity can be reduced, and blind detection overheads can be reduced. In addition, the terminal can aggregate the feedback information corresponding to the component carriers including the plurality of numerologies and feed back the aggregated feedback information by sharing one PUCCH. Therefore, a limitation on a terminal power can be avoided.

In a possible design, before the network device sends the control information corresponding to the first component carrier to the terminal over the second component carrier, the network device receives information about a first capability that is reported by the terminal, and the information about the first capability is used to notify the network device that the terminal supports carrying of the control information corresponding to the first component carrier on the second component carrier.

According to the foregoing method, the network device can determine, based on the information about the first capability that is reported by the terminal, that the terminal can support cross-component carrier scheduling.

For specific implementations of the tenth aspect, refer to any one of the first to the ninth aspects and possible implementations of the first to the ninth aspects, and descriptions of corresponding aspects in the embodiments of this application in addition to the literal descriptions, and details are not described herein again.

According to an eleventh aspect, an embodiment of this application provides a network device for component carrier aggregation and feedback, a structure of the network device includes a processor, a transmitter, and a receiver. The transmitter and the receiver are configured to communicate and interact with a terminal, and the processor is configured to support the network device in performing a corresponding function in the method according to the tenth aspect. The network device may further include a memory. The memory is coupled to the processor and stores a program instruction and data that are necessary to the network device.

In the embodiments of this application, the network device groups the component carriers configured for the terminal into the at least one component carrier group of the first type, and the network device sends the first grouping configuration information to the terminal. Alternatively, in the scenario of aggregating the component carriers including the plurality of numerologies, the network device may perform cross-component carrier scheduling on a component carrier including each numerology in downlink, and the component carriers including the plurality of numerologies may share one PUCCH for feedback. According to the component carrier grouping method and the component carrier aggregation and feedback method provided in the embodiments of this application, the component carrier group grouped based on the cross-component carrier feedback and the component carrier group grouped based on the cross-component carrier scheduling can be decoupled, so that the component carrier aggregation scheduling performed by the network device under the aggregation of the component carriers including the different numerologies can be simplified, the quantity of required processes can be reduced, the timing value indication complexity can be reduced, and the blind detection overheads can be reduced. In addition, the terminal can aggregate the feedback information corresponding to the component carriers in the at least two component carrier groups of the first type and feed back the aggregated feedback information over a same component carrier. Therefore, the limitation to the terminal power can be avoided.

DETAILED DESCRIPTION OF ILLUSTRATIVE EMBODIMENTS

Figure 1:
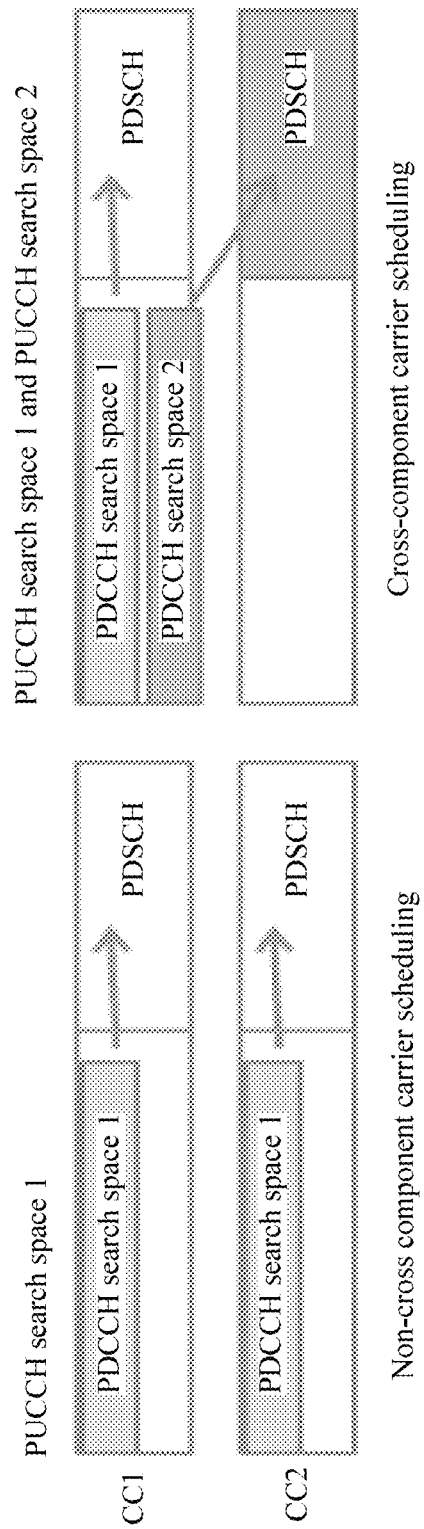
FIG. 1 is a schematic diagram of cross-component carrier scheduling in the background of this application.
Figure 2:
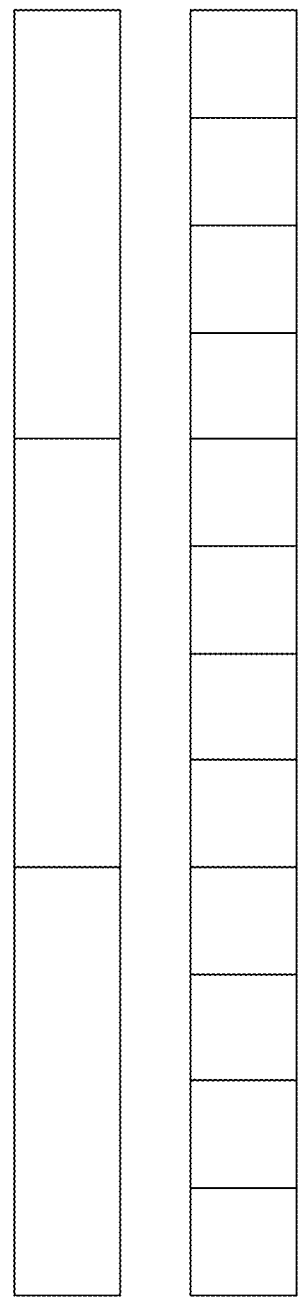
FIG. 2 is a schematic diagram of component carriers having different time unit lengths in the background of this application.

The following describes the embodiments of this application with reference to accompanying drawings.

A technology described in this application is applicable to radio communications systems using various radio access technologies, for example, a system using an access technology such as code division multiple access (CDMA), frequency division multiple access (FDMA), time division multiple access (TDMA), orthogonal frequency division multiple access (OFDMA), or single component carrier-frequency division multiple access (SC-FDMA), and is further applicable to a subsequent evolved system, for example, a fifth-generation (5G) (which may also be referred to as new radio (NR)) system.

Network elements in the embodiments of this application include a network device and a terminal. The network device is an access device that is in a mobile communications system and that is wirelessly accessed by the terminal, and may be a NodeB, an evolved NodeB (eNodeB), a base station in a 5G mobile communications system, a base station in a future mobile communications system, an access node in a Wi-Fi system, or the like. A specific technology used for and a specific device form of the network device are not limited in the embodiments of this application.

The terminal may also be referred to as terminal equipment, user equipment (UE), a mobile station (MS), a mobile terminal (mobile terminal, MT), and the like. The terminal may be a mobile phone, a tablet computer (Pad), a computer having a wireless sending and receiving function, a virtual reality (VR) terminal device, an augmented reality (AR)

terminal device, a wireless terminal in industrial control (industrial control), a wireless terminal in self driving, a wireless terminal in remote medical surgery, a wireless terminal in a smart grid, a wireless terminal in transportation safety, a wireless terminal in a smart city, a wireless terminal in a smart home, or the like.

During data transmission, data is transmitted by using a time unit as a granularity. The time unit may be a subframe, or a transmission time interval (where one transmission time interval is equal to a sum of several subframe lengths, or a sum of several transmission time intervals is equal to a subframe length), or a slot, or aggregation of a plurality of slots, or a mini-slot (mini-slot), or aggregation of a plurality of mini-slots, or aggregation of a mini-slot and a slot, or a time domain symbol, or a plurality of time domain symbols, or the like. An existing NR technology mainly supports a subcarrier spacing of 15 kHz*2n, where n is an integer. Assuming that a normal cyclic prefix (normal CP) length is configured and a slot including 14 time domain symbols is used as a time unit, a time unit length corresponding to the 15 kHz*2n-subcarrier spacing is 1/(2n) ms, to be specific, 0.5 ms, 0.25 ms, 0.125 ms, and the like are supported. If a slot including seven time domain symbols is considered, a length of the slot is correspondingly reduced by half. Similarly, a length of a mini-slot also depends on a quantity of symbols of the mini-slot.

For example, in an LTE system, a subcarrier spacing is 15 kHz, and a time unit corresponding to a slot or subframe including 14 time domain symbols is 1 ms. As the subcarrier spacing is increased, the time unit is correspondingly proportionally reduced. For example, if the subcarrier spacing is 60 kHz, the time unit is reduced to 0.25 ms.

In a 5G NR system, a component carrier configuration parameter (numerology) of a component carrier may include a subcarrier spacing, a time unit length, a CP type, and the like.

In this embodiment of this application, the component carrier (CC) is also referred to as a cell. In an existing LTE/LTE-A system, in consideration of a limitation on a power of the terminal, the network device groups, based on one or more HARQ-ACKs, a plurality of component carriers configured for the terminal into groups. In this case, these component carriers are grouped into a maximum of two component carrier groups, which are respectively a component carrier group including a primary component carrier (Primary cell, Pcell) and a component carrier group that does not include a Pcell. For the component carrier group including a Pcell, one or more HARQ-ACK messages over component carriers in the component carrier group may be aggregated and fed back over the Pcell, to be specific, the one or more HARQ-ACK messages are aggregated and fed back over a PUCCH of the Pcell. For the other component carrier group that does not include a Pcell, one or more HARQ-ACK messages over component carriers in the component carrier group may be aggregated and fed back over a serving component carrier (serving cell, Scell). Therefore, all existing component carrier groups are component carrier groups grouped based on cross-component carrier feedback. It should be understood that the aggregation and the feedback herein are also referred to as joint feedback or feedback over one PUCCH.

In addition, in an existing technology, cross-component carrier scheduling can be implemented for each component carrier group, but the cross-component carrier scheduling is limited in the component carrier group grouped based on the cross-component carrier feedback. In addition, in NR, due to existence of different time units, many new problems may occur when cross-component carrier scheduling is performed in a component carrier group grouped based on cross-component carrier feedback. The problems include the following.

Figure 3:
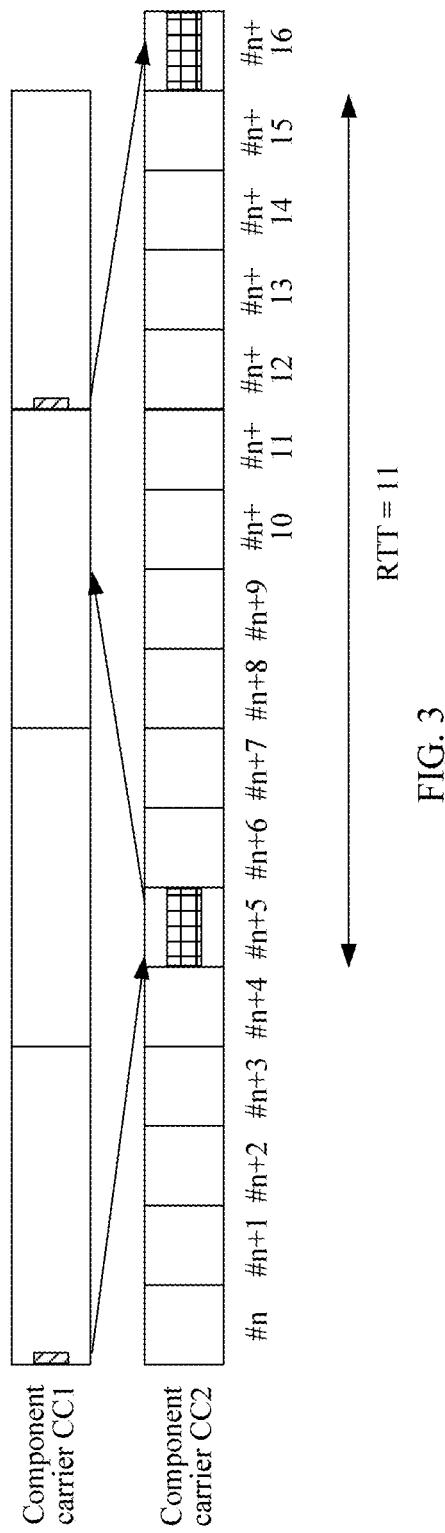
FIG. 3 is a schematic diagram of scheduling across component carriers having different time unit lengths according to an embodiment of this application.

(1) A maximum quantity of processes can be affected and scheduling across component carriers including different numerologies requires more processes. Referring to FIG. 3, the network device sends first control information of a CC2 to the terminal over a CC1. A time interval between a time unit carrying the first control information and a time unit carrying uplink data sent by the terminal is not smaller than a preset time interval, and it is assumed that the preset time interval is five subframes corresponding to the CC2. Therefore, the terminal sends uplink data to the network device in a subframe n+5 and over the CC2. After the network device receives the uplink data, the network device needs to feed back second control information to the terminal, and the second control information instructs the terminal whether to retransmit the uplink data or send new data for initial transmission. The network device needs to feed back the second control information to the terminal within several initial symbols in the time unit corresponding to the CC1, so that the network device postpones feeding back the second control information to the terminal until a next time unit. Therefore, a time unit interval between two times of sending of the uplink data performed by the terminal for the foregoing cross-component carrier scheduling is relatively large, so that a larger quantity of processes is required to ensure continuous transmission.

(2) A timing value indication is complex or costs high overheads. As shown in FIG. 3, when the network device sends the first control information of the CC2 to the terminal over the CC1, the network device may further indicate a timing value, so that the terminal sends the uplink data over the CC2 in a specified time unit. However, for the indication of the timing value, the time unit corresponding to the CC1 and the time unit corresponding to the CC2 need to be described. Consequently, the timing value indication is complex or costs high overheads.

(3) Bind detection performed by the terminal costs high overheads. As shown in FIG. 3, when the network device sends first control information of the CC2 to the terminal over the CC1, a quantity of times of blind detection performed by the terminal is increased (to be specific, blind detection needs to be performed for each time unit of the CC1). Consequently, blind detection overheads are relatively high.

Figure 4:
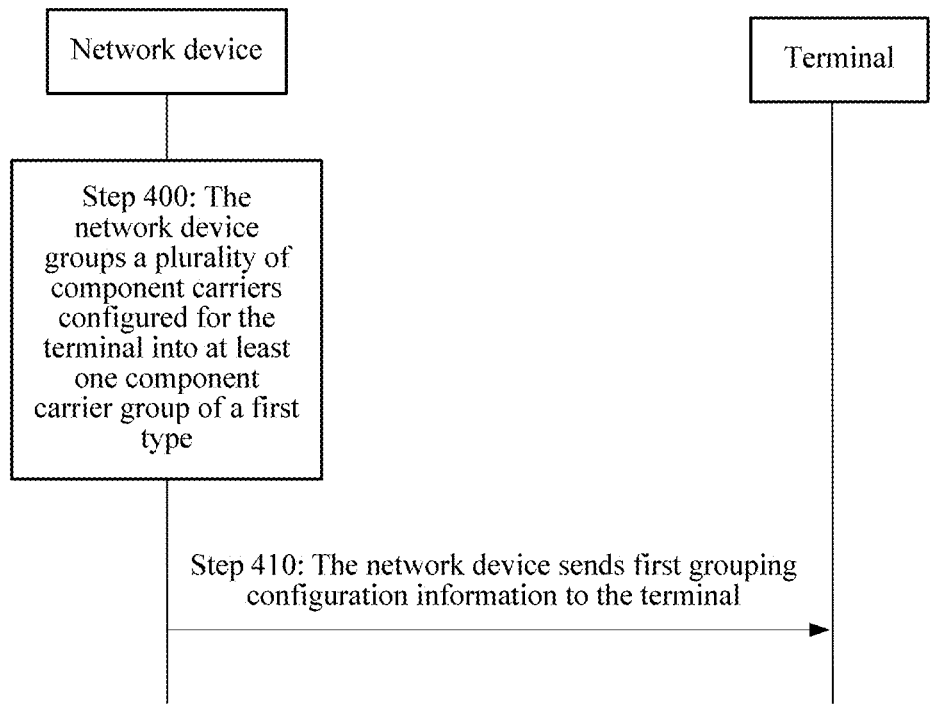
FIG. 4 is an overview flowchart of a component carrier grouping method according to an embodiment of this application.

Therefore, as shown in FIG. 4, an embodiment of this application provides a component carrier grouping method, to resolve the foregoing problems. The method includes the following steps.

Step 400: The network device groups a plurality of component carriers configured for the terminal into at least one component carrier group of a first type, so that the network device sends control information corresponding to a first component carrier to the terminal over a second component carrier, where the first component carrier and the second component carrier belong to a same component carrier group of the first type, and when a plurality of component carriers in at least two component carrier groups of the first type are scheduled, the terminal aggregates feedback information corresponding to the plurality of component carriers and feeds back the aggregated feedback information to the network device over one component carrier.

Step 410: The network device sends first grouping configuration information to the terminal, where the first grouping configuration information is used to indicate a grouping result of the at least one component carrier group of the first type.

For step 410, signaling for sending the first grouping configuration information may be configured through radio resource control (RRC), or may be a master information block (MIB) message, a system information block (SIB) message, RRC signaling, a media access control control element (MAC CE), downlink control information (DCI), or a combination of the foregoing plurality of pieces of signaling (for example, an RRC+DCI manner).

It should be understood that, in a scenario of aggregating component carriers including a plurality of numerologies, the network device may perform cross-component carrier scheduling on a component carrier including each numerology in downlink, and the component carriers including the plurality of numerologies share one PUCCH for feedback.

In a possible implementation, the component carriers included in the component carrier group of the first type have a same subcarrier spacing or time unit length, to be specific, the network device groups, by using the same subcarrier spacing or the same time unit length as a grouping criterion, the plurality of component carriers configured for the terminal into the at least one component carrier group of the first type. Therefore, cross-component carrier scheduling complexity can be greatly reduced in the grouping manner. In addition, in another possible implementation, a maximum of one component carrier group of the first type has component carriers having different subcarrier spacings or different time unit lengths. For example, the network device may alternatively first group, by using the same subcarrier spacing or the same time unit length as the grouping criterion, the plurality of component carriers configured for the terminal into the at least one component carrier group of the first type, and then use a remaining component carrier as one component carrier group of the first type.

In a possible implementation, at least two component carriers included in the component carrier group of the first type have a maximum of two different subcarrier spacing or time unit length configurations, to be specific, component carriers allocated by the network device to each component carrier group of the first type have a maximum of two different subcarrier spacing or time unit length configurations, to reduce the cross-component carrier scheduling complexity, thereby avoiding relatively high cross-component carrier scheduling complexity caused by excessively many types of subcarrier spacing or time unit length configurations in the component carrier group.

Further optionally, component carriers included in one component carrier group of the first type have a maximum of two different subcarrier spacing or time unit length configurations, and the two different subcarrier spacings or time unit lengths are two neighboring component carrier spacings or time unit lengths that are supported by the terminal or a system. For example, for component carriers whose subcarrier spacings are configured to 15 kHz, 60 kHz, and 120 kHz, component carriers whose subcarrier spacings are configured to 15 kHz and 60 kHz may be grouped into one group, and component carriers whose subcarrier spacings are configured to 15 kHz and 120 kHz cannot be grouped into one group.

In addition, in a possible design, the at least two component carriers included in the component carrier group of the first type have a maximum of two different subcarrier spacing or time unit length configurations. This grouping manner is easier.

It should be understood that the network device cannot perform cross-component carrier scheduling between two component carrier groups of the first type. For example, a g1 and a g2 are two component carrier groups of the first type, so that the network device cannot add control information of a component carrier in the g1 over a component carrier in the g2.

It should be understood that the grouping, by the network device, a plurality of component carriers configured for the terminal into at least one component carrier group of a first type may be that the component carriers configured for the terminal are grouped into one component carrier group of the first type; or some component carriers (for example, activated component carriers) configured for the terminal are grouped into at least one component carrier group of the first type, and a remaining component carrier configured for the terminal does not belong to any component carrier group of the first type. For example, the network device configures five component carriers for the terminal. A component carrier 1, a component carrier 2, and a component carrier 3 that have a same subcarrier spacing are used as one component carrier group of the first type. A component carrier 4 and a component carrier 5 have different subcarrier spacings and the subcarrier spacings are different from the subcarrier spacing of the component carrier 1. Therefore, the component carrier 4 and the component carrier 5 may be used as one component carrier group of the first type, or the component carrier 4 and the component carrier 5 may not be used as one component carrier group of the first type.

In a possible implementation, before the network device groups the plurality of component carriers configured for the terminal into the at least one component carrier group of the first type, the network device receives information about a first capability that is reported by the terminal, and the information about the first capability is used to notify the network device whether the terminal supports carrying of the control information corresponding to the first component carrier on the second component carrier, to be specific, whether the terminal can support the cross-component carrier scheduling. For example, the information about the first capability may be used to notify the network device that the terminal supports carrying of the control information corresponding to the first component carrier on the second component carrier, or the information about the first capability may be used to notify the network device that the terminal does not support carrying of the control information corresponding to the first component carrier on the second component carrier.

Therefore, the network device may determine, based on the information about the first capability that is reported by the terminal, that the terminal can support the cross-component carrier scheduling, and then group the plurality of component carriers configured for the terminal into the at least one component carrier group of the first type.

Further, in a possible implementation, the information about the first capability is further used to indicate a difference between a component carrier configuration parameter of the first component carrier and a component carrier configuration parameter of the second component carrier that are supported by the terminal. The component carrier configuration parameter herein may be a subcarrier spacing or a time unit length. For example, a subcarrier spacing of the first component carrier that is supported by the terminal is 15 kHz, and a subcarrier spacing of the second component carrier that is supported by the terminal is 30 kHz; or a subcarrier spacing of the first component carrier that is supported by the terminal is 15 kHz, and a subcarrier spacing of the second component carrier that is supported by the terminal is 60 kHz. For another example, a ratio indicating a maximum difference between the subcarrier spacing of the first component carrier that is supported by the terminal and the subcarrier spacing of the second component carrier that is supported by the terminal is 1:2 or 1:4. When the ratio indicating the maximum difference between the subcarrier spacing of the first component carrier that is supported by the terminal and the subcarrier spacing of the second component carrier that is supported by the terminal is 1:4, a ratio of the subcarrier spacing of the first component carrier that is supported by the terminal to the subcarrier spacing of the second component carrier that is supported by the terminal may be 1:1, 1:2, or 1:4.

In this case, the network device groups, based on the information about the first capability, the plurality of component carriers configured for the terminal into the at least one component carrier group of the first type. The information about the first capability includes a specific capability supported by the terminal. Therefore, the network device may group, based on the specific capability, the plurality of component carriers configured for the terminal into the at least one component carrier group of the first type, so that the at least one grouped component carrier group of the first type is more targeted, and can be supported by the terminal.

In a possible implementation, the network device groups a plurality of component carriers configured for the terminal into at least one component carrier group of a second type, so that the terminal sends feedback information corresponding to each component carrier in each component carrier group of the second type to the network device over a primary component carrier or one component carrier in the component carrier group of the second type. The component carrier group of the second type herein is similar to an existing component carrier grouping. For details, refer to the foregoing method for grouping, by the network device based on one or more HARQ-ACKs, a plurality of component carriers configured for the terminal. The network device sends second grouping configuration information to the terminal, and the second grouping configuration information is used to indicate a grouping result of the at least one component carrier group of the second type.

In addition, the information about the first capability may further include whether the terminal supports cross-component carrier feedback.

In a possible implementation, there is an intersection set between each component carrier group of the first type and at least one component carrier group of the second type.

Figure 6:
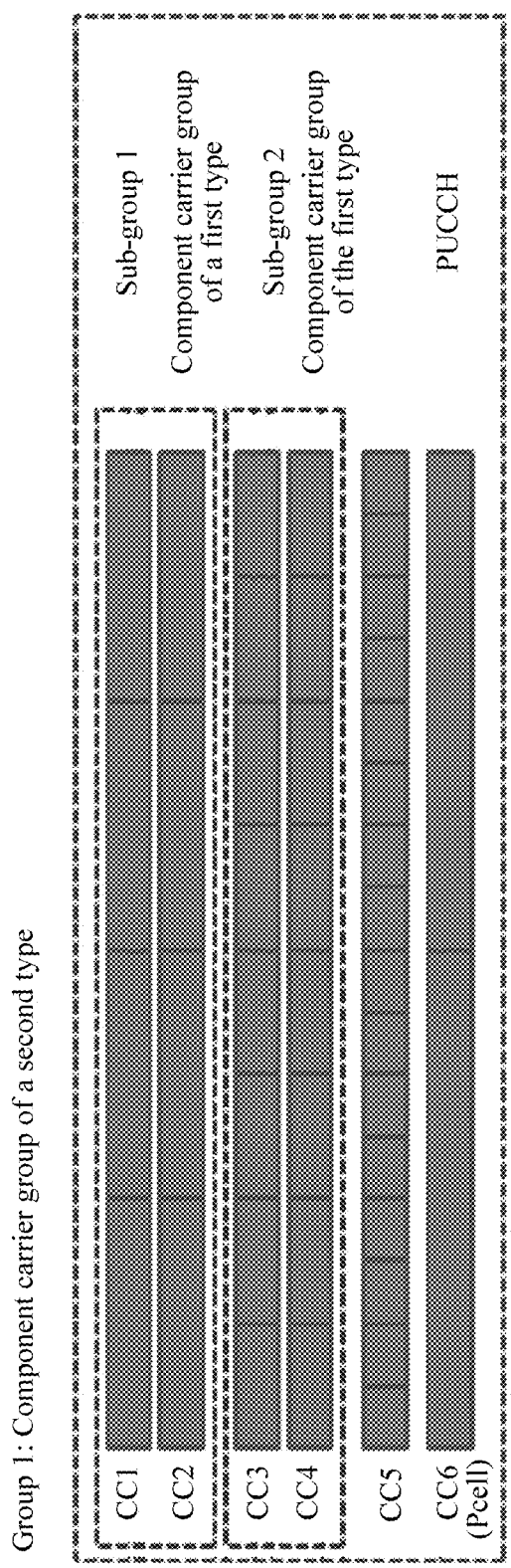
FIG. 6 is a first schematic diagram of component carrier grouping according to an embodiment of this application.

For example, the component carrier group of the first type is a subset of one component carrier group of the second type. As shown in FIG. 6, both a sub-group (sub-group) 1 and a sub-group 2 are subsets of a group 1.

Figure 7:
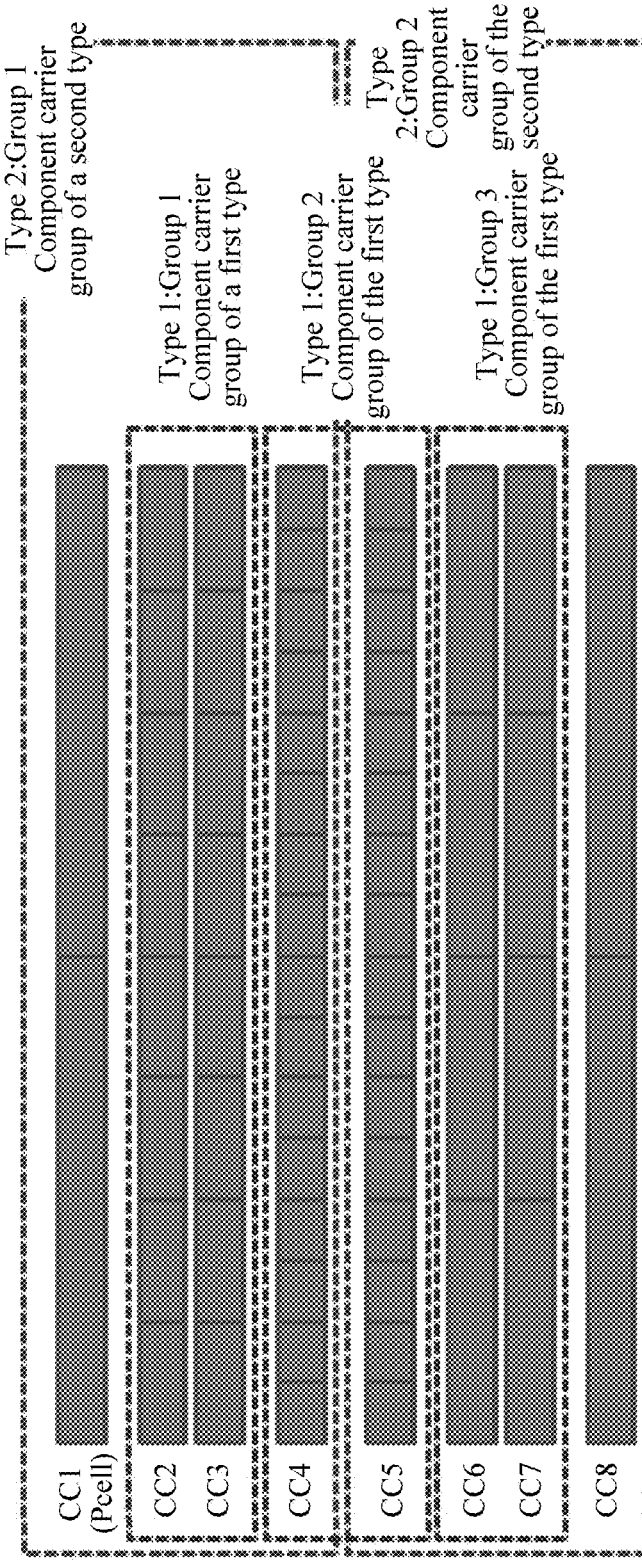
FIG. 7 is a second schematic diagram of component carrier grouping according to an embodiment of this application.

For another example, there are intersection sets between the component carrier group of the first type and two component carrier groups of the second type, to be specific, the component carrier group of the first type and the two component carrier groups of the second type have partially overlapping component carriers. As shown in FIG. 7, the second component carrier group of the first type (Type 1:Group 2) and the first component carrier group of the second type (Type 2:Group 1) have an overlapping component carrier CC4, and the second component carrier group of the first type (Type 1:Group 2) and the second component carrier group of the second type (Type 2:Group 2) have an overlapping component carrier CC5.

In a possible implementation, when one component carrier group of the second type includes a plurality of component carrier groups of the first type, and at least two component carriers in the plurality of component carrier groups of the first type are scheduled, the network device receives aggregated feedback information corresponding to the at least two component carriers over a primary component carrier or one component carrier in the component carrier group of the second type, where the aggregated feedback information is feedback information fed back by the terminal to the network device after the terminal aggregates feedback information corresponding to the at least two component carriers. For example, each piece of HARQ ACK feedback information corresponding to each of 10 component carriers corresponds to one bit, and the terminal aggregates 10-bit HARQ ACK feedback information into one piece of feedback information, and feeds back the aggregated piece of feedback information to the network device over one component carrier (for example, one PUCCH).

The component carrier grouping method is specifically described with reference to the accompanying drawings.

Figure 5:
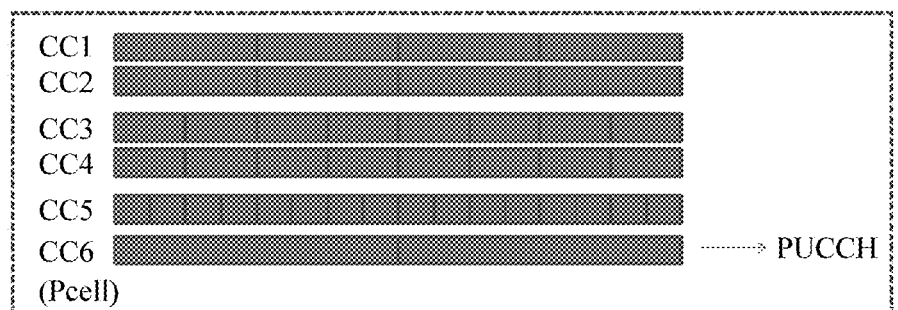
FIG. 5 is a schematic component carrier configuration diagram before component carriers are grouped according to an embodiment of this application.

As shown in FIG. 5, it is assumed that the network device configures a plurality of component carriers for the terminal, for example, six component carriers shown in FIG. 5, and the network device uses the six component carriers as one component carrier group of the second type, which is indicated by using Group 1. Specifically, a component carrier 6 is a Pcell, and it is assumed that a subcarrier spacing of the component carrier 6 is 15 kHz. Therefore, the terminal aggregates feedback information corresponding to a component carrier 1 to the component carrier 6, and feeds back the aggregated feedback information to the network device over the component carrier 6. Therefore, the component carrier group of the second type is a component carrier group grouped based on cross-component carrier feedback.

Subcarrier spacings of the component carrier 1 and the component carrier 2 are both 30 kHz, subcarrier spacings of the component carrier 3 and the component carrier 4 are both 60 kHz, and a subcarrier spacing of the component carrier 5 is 120 kHz. Further, the network device groups the six carries configured for the terminal into two component carrier groups of the first type, which are respectively a sub-group 1 and a sub-group 2. As shown in FIG. 6, the sub-group 1 includes the component carrier 1 and the component carrier 2, and the sub-group 2 includes the component carrier 3 and the component carrier 4. In each sub-group, cross-component carrier scheduling can be implemented. For example, control information corresponding to the component carrier 1 may be carried over the component carrier 2, control information corresponding to the component carrier 3 may be carried over the component carrier 4, but control information corresponding to the component carrier 1 cannot be carried over the component carrier 4. Therefore, the component carrier group of the first type is a component carrier group grouped based on cross-component carrier scheduling.

In addition, the network device may further use the component carrier 5 and the component carrier 6 as one component carrier group of the first type based on the information about the first capability that is reported by the terminal. Alternatively, when the information about the first capability that is reported by the terminal indicates that the terminal does not support a ratio of 1:8 between subcarrier spacings of two component carriers, the network device does not use the component carrier 5 and the component carrier 6 as one component carrier group of the first type.

As shown in FIG. 6, both the sub-group 1 and the sub-group 2 are subsets of the group 1. Further, the sub-group 1 and the sub-group 2 may share one PUCCH for feedback, to be specific, feedback is performed over the component carrier 6. Therefore, the network device groups the component carriers configured for the terminal into the at least one component carrier group of the first type, so that component carrier aggregation scheduling performed by the network device under aggregation of component carriers including different numerologies can be simplified. For example, component carriers including a same numerology may be grouped into one group. In addition, the terminal may aggregate the feedback information corresponding to the component carriers in the at least two component carrier groups of the first type, and feed back the aggregated feedback information over a same component carrier. Therefore, problems such as a limitation on a terminal power and a limitation on uplink coverage can further be avoided. In addition, the component carrier group grouped based on the cross-component carrier feedback and the component carrier group grouped based on the cross-component carrier scheduling are decoupled, and the cross-component carrier scheduling is not limited in the component carrier group grouped based on the cross-component carrier feedback any longer.

As shown in FIG. 7, it is assumed that the network device configures a plurality of component carriers for the terminal, for example, eight component carriers shown in FIG. 7, and the network device uses a CC1 to a CC4 as one component carrier group of the second type, which is indicated by using Type 2:Group 1; and uses a CC5 to a CC8 as one component carrier group of the second type, which is indicated by using Type 2: Group 2. Specifically, the CC1 is a Pcell, and it is assumed that a subcarrier spacing of the CC1 is 15 kHz. Therefore, the terminal aggregates feedback information corresponding to the CC1 to the CC4, and feeds back the aggregated feedback information to the network device over the CC1. The subcarrier spacing of the CC8 is 15 kHz. The terminal aggregates feedback information corresponding to the CC5 to the CC8, and feeds back the aggregated feedback information to the network device over the CC8.

Subcarrier spacings of the CC2 and the CC3 are both 60 kHz, subcarrier spacings of the CC5 and the CC4 are both 120 kHz, and subcarrier spacings of the CC7 and the CC6 are both 30 kHz. Further, the network device groups the six component carriers into three component carrier groups of the first type, which are respectively Type 1:Group 1, Type 1:Group 2, and Type 1:Group 3. As shown in FIG. 7, Type 1:Group 1 includes the CC2 and the CC3, Type 1:Group 2 includes the CC4 and the CC5, and Type 1:Group 3 includes the CC6 and the CC7. In each sub-group, cross-component carrier scheduling can be implemented. For example, control information corresponding to the CC2 is carried over the CC3, control information corresponding to the CC4 is carried over the CC5, control information corresponding to the CC6 is carried over the CC7, but control information corresponding to the CC7 cannot be carried over the CC4.

As shown in FIG. 7, Type 1:Group 2 and Type 2: Group 1 have an overlapping component carrier CC4, and Type 1:Group 2 and Type 2:Group 2 have an overlapping component carrier CC5. Type 1:Group 1 and Type 2:Group 2 have no overlapping component carrier. Therefore, Type 1:Group 1 and Type 2:Group 2 are completely decoupled.

Further, HARQ-ACKs of PDSCHs of the CC1 to the CC4 may be carried over a PUCCH of the CC1, and HARQ-ACKs of PDSCHs of the CC5 to the CC8 may be carried over a PUCCH of the CC8. Therefore, the network device groups the component carriers configured for the terminal into the at least one component carrier group of the first type, so that component carrier aggregation scheduling performed by the network device under aggregation of component carriers including different numerologies can be simplified. In addition, the terminal may aggregate feedback information corresponding to the component carriers in the at least one component carrier groups of the first type, and feed back the aggregated feedback information over a same component carrier. Therefore, the limitation on the terminal power can further be avoided. In addition, the component carrier group grouped based on the cross-component carrier feedback and the component carrier group grouped based on the cross-component carrier scheduling may be completely decoupled, and the cross-component carrier scheduling is not limited in the component carrier group grouped based on the cross-component carrier feedback any longer.

Figure 8:
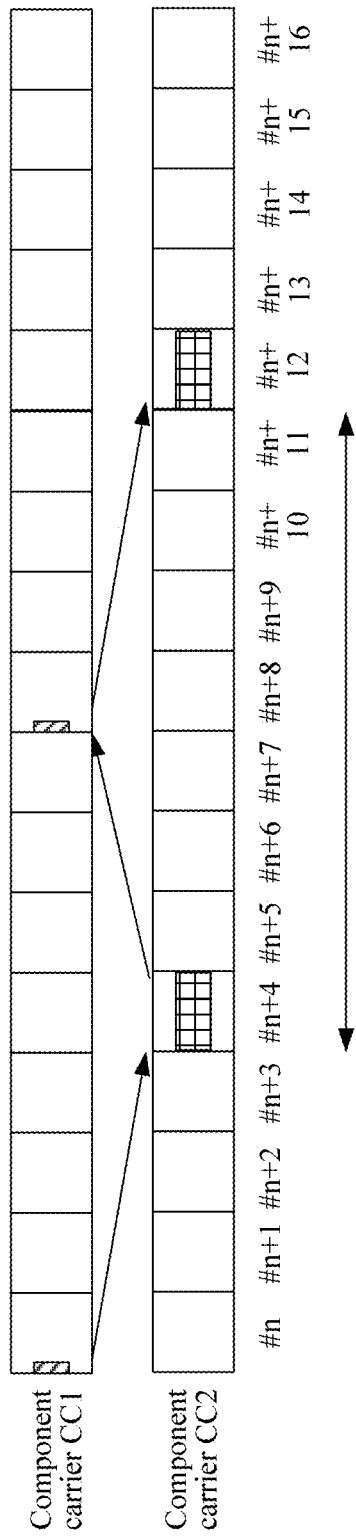
FIG. 8 is a schematic diagram of scheduling across component carriers including a same numerology according to an embodiment of this application.

As shown in FIG. 8, compared with FIG. 3, scheduling across component carriers including a same numerology requires a relatively small quantity of processes. Time unit lengths of the CC1 and the CC2 are the same. Therefore, timing value indication complexity is relatively low (for example, a timing relationship in LTE may be multiplexed), and overheads of blind detection performed by the terminal may not be increased.

Figure 9:
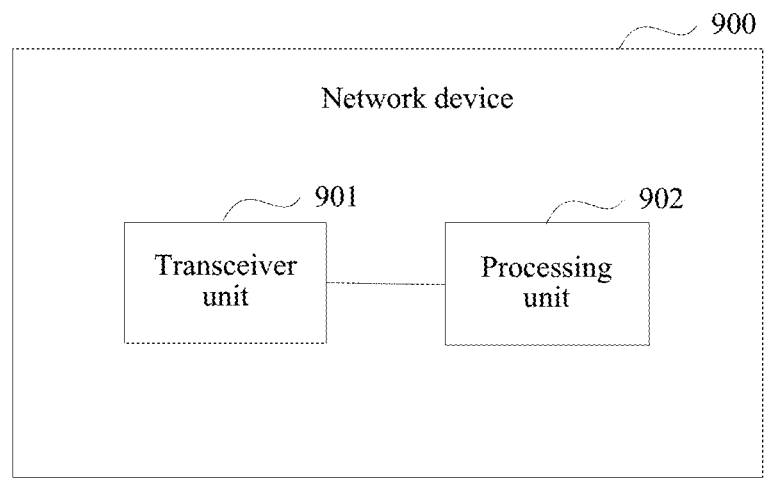
FIG. 9 is a first schematic structural diagram of a network device according to an embodiment of this application.

Based on the foregoing embodiments, an embodiment of this application provides a network device, configured to implement the component carrier grouping method shown in FIG. 4. As shown in FIG. 9, the network device 900 includes a transceiver unit 901 and a processing unit 902.

The processing unit 902 is configured to group a plurality of component carriers configured for a terminal into at least one component carrier group of a first type, so that the transceiver sends control information corresponding to a first component carrier to the terminal over a second component carrier, the first component carrier and the second component carrier belong to a same component carrier group of the first type, and when a plurality of component carriers in at least two component carrier groups of the first type are scheduled, the terminal aggregates feedback information corresponding to the plurality of component carriers and feeds back the aggregated feedback information to the network device over one component carrier.

The transceiver unit 901 is configured to send first grouping configuration information to the terminal, and the first grouping configuration information is used to indicate a grouping result of the at least one component carrier group of the first type.

Figure 10:
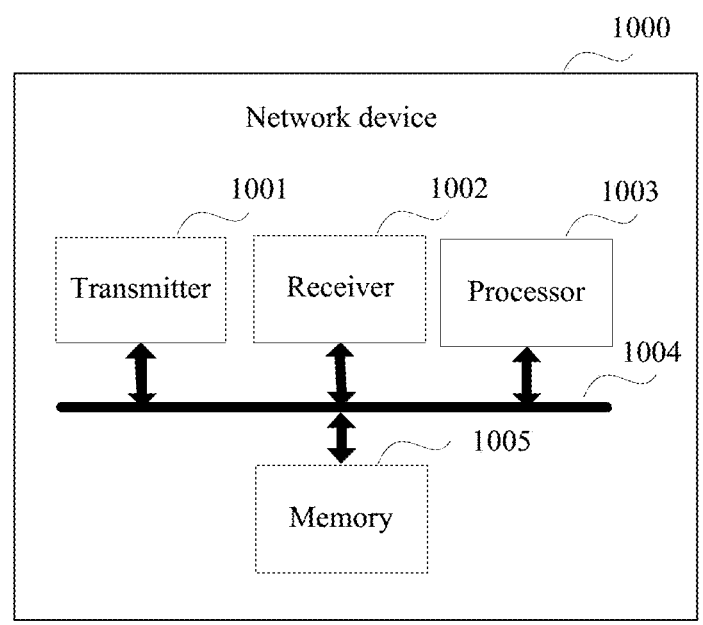
FIG. 10 is a second schematic structural diagram of a network device according to an embodiment of this application.

For details, refer to the method example shown in FIG. 4 and detailed descriptions of the network device in FIG. 10, and details are not described herein again.

It should be noted that the unit division in this embodiment of this application is an example, and is merely logical function division and may be other division in actual implementations. The functional units in this embodiment of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor (processor) to perform all or some of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

Based on the foregoing embodiments, an embodiment of this application further provides a network device, configured to implement the component carrier grouping method shown in FIG. 4 and having a function of the network device 900 shown in FIG. 9. As shown in FIG. 10, the network device 1000 includes a transmitter 1001, a receiver 1002, a processor 1003, a bus 1004, and a memory 1005. A function of the transceiver unit 901 is implemented by the transmitter 1001 and the receiver 1002, and a function of the processing unit 902 is implemented by the processor 1003.

Specifically, the transmitter 1001, the receiver 1002, the processor 1003, and the memory 1005 are connected to each other by using the bus 1004. The bus 1004 may be a peripheral component interconnect (PCI) bus, an extended industry standard architecture (EISA) bus, or the like. The bus may be classified into an address bus, a data bus, a control bus, and the like. For ease of indication, the bus is indicated by using only one bold line in FIG. 10. However, it does not indicate that there is only one bus or only one type of bus.

The memory 1005 is configured to store a program and the like. Specifically, the program may include program code, and the program code includes a computer operation instruction. The memory 1005 may include a random access memory (RAM), or may include a non-volatile memory, for example, at least one magnetic disk memory. The processor 1003 executes program stored in the memory 1005 to implement the foregoing function, to implement the component carrier grouping method shown in FIG. 4.

When the instruction stored in the memory 1005 is executed by the processor 1003, the processor 1003 groups a plurality of component carriers configured for a terminal into at least one component carrier group of a first type, so that a transceiver sends control information corresponding to a first component carrier to the terminal over a second component carrier, where the first component carrier and the second component carrier belong to a same component carrier group of the first type, and when a plurality of component carriers in at least two component carrier groups of the first type are scheduled, the terminal aggregates feedback information corresponding to the plurality of component carriers and feeds back the aggregated feedback information to the network device over one component carrier; and the transmitter 1001 sends first grouping configuration information to the terminal, where the first grouping configuration information is used to indicate a grouping result of the at least one component carrier group of the first type.

In a possible design, before the processor 1003 groups the plurality of component carriers configured for the terminal into the at least one component carrier group of the first type, the receiver receives information about a first capability that is reported by the terminal, and the information about the first capability is used to notify the network device that the terminal supports carrying of the control information corresponding to the first component carrier on the second component carrier.

In a possible design, at least two component carriers included in the component carrier group of the first type have a same subcarrier spacing or time unit length; or at least two component carriers included in the component carrier group of the first type have a maximum of two different subcarrier spacing or time unit length configurations.

In a possible design, the information about the first capability is further used to indicate a difference between a component carrier configuration parameter of the first component carrier and a component carrier configuration parameter of the second component carrier that are supported by the terminal.

The processor 1003 groups, based on the information about the first capability, the plurality of component carriers configured for the terminal into the at least one component carrier group of the first type.

In a possible design, the processor 1003 further groups a plurality of component carriers configured for the terminal into at least one component carrier group of a second type, so that the terminal sends feedback information corresponding to each component carrier in each component carrier group of the second type to the network device over a primary component carrier or any component carrier in the component carrier group of the second type; and the transmitter 1001 sends second grouping configuration information to the terminal, where the second grouping configuration information is used to indicate a grouping result of the at least one component carrier group of the second type.

In a possible design, there is an intersection set between each component carrier group of the first type and at least one component carrier group of the second type.

In a possible design, when one component carrier group of the second type includes a plurality of component carrier groups of the first type, and at least two component carriers in the plurality of component carrier groups of the first type are scheduled, the receiver 1002 further receives aggregated feedback information corresponding to the at least two component carriers over a primary component carrier or any component carrier in the component carrier group of the second type, where the aggregated feedback information is feedback information fed back by the terminal to the network device after the terminal aggregates feedback information corresponding to the at least two component carriers.

Based on the foregoing embodiments, an embodiment of this application provides a terminal, configured to implement the component carrier grouping method shown in FIG. 4. As shown in FIG. ii, the terminal 1100 includes a sending unit 1101 and a receiving unit 1102.

The receiving unit 1102 receives first grouping configuration information sent by a network device, and the first grouping configuration information is used to indicate a grouping result of at least one component carrier group of a first type.

The receiving unit 1102 further receives control information corresponding to a first component carrier that is sent by the network device over a second component carrier, the first component carrier and the second component carrier belong to a same component carrier group of the first type, and/or when a plurality of component carriers in at least two component carrier groups of the first type are scheduled, the sending unit 1101 is configured to: aggregate feedback information corresponding to the plurality of component carriers, and feed back the aggregated feedback information to the network device over one component carrier.

Figure 12:
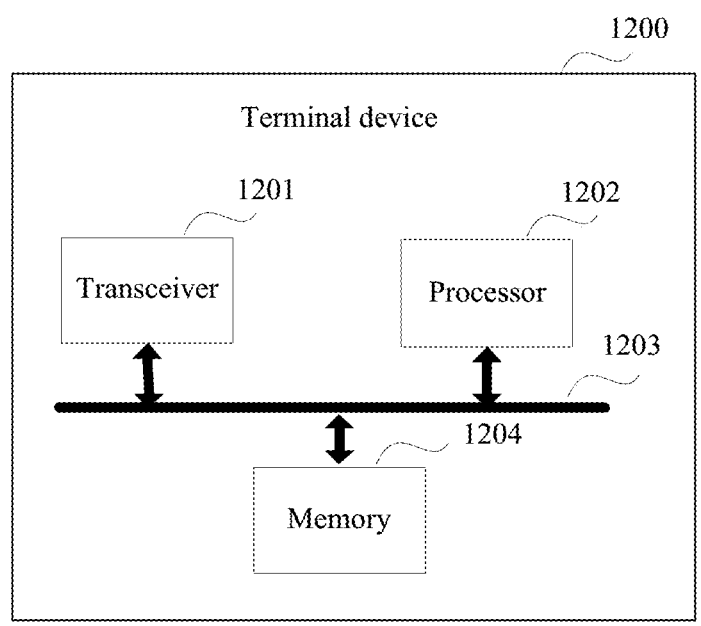
FIG. 12 is a second schematic structural diagram of a terminal according to an embodiment of this application.

For details, refer to the method example shown in FIG. 4 and detailed descriptions of the terminal in FIG. 12, and details are not described herein again.

Figure 11:
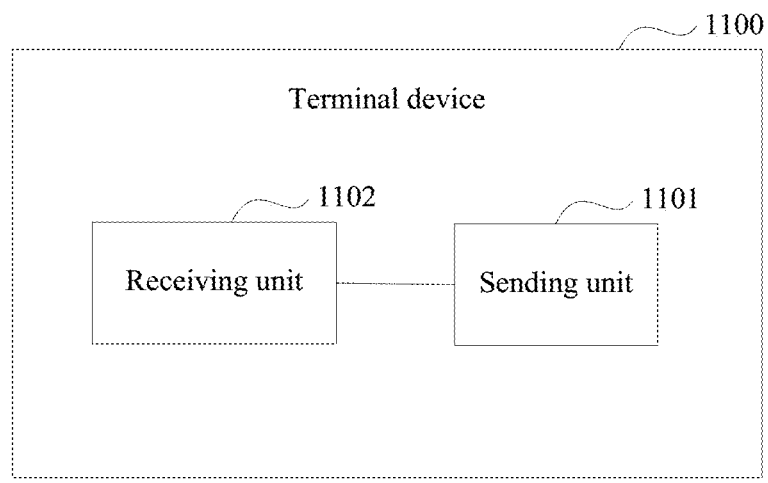
FIG. 11 is a first schematic structural diagram of a terminal according to an embodiment of this application.

Based on the foregoing embodiments, an embodiment of this application further provides a terminal, configured to implement the component carrier grouping method shown in FIG. 4 and having a function of the terminal 1100 shown in FIG. 11. As shown in FIG. 12, the terminal device includes a transceiver 1201, a processor 1202, a bus 1203, and a memory 1204. Functions of the sending unit 1101 and the receiving unit 1102 are implemented by the transceiver 1201.

Specifically, the transceiver 1201, the processor 1202, and the memory 1204 are connected to each other by using the bus 1203. The bus 1203 may be a PCI bus, an EISA bus, or the like. The bus may be classified into an address bus, a data bus, a control bus, or the like. For ease of indication, the bus is indicated by using only one bold line in FIG. 12. However, it does not indicate that there is only one bus or only one type of bus.

The memory 1204 is configured to store a program and the like. Specifically, the program may include program code, and the program code includes a computer operation instruction. The memory 1204 may include a RAM, and may further include a non-volatile memory, for example, at least one magnetic disk storage. The processor 1202 executes program stored in the memory 1204 to implement the foregoing function, to implement the component carrier grouping method shown in FIG. 4.

When the instruction stored in the memory 1204 is executed by the processor 1202, the transceiver 1201 receives first grouping configuration information sent by a network device, where the first grouping configuration information is used to indicate a grouping result of at least one component carrier group of a first type; and the transceiver 1201 further receives control information corresponding to a first component carrier that is sent by the network device over a second component carrier, where the first component carrier and the second component carrier belong to a same component carrier group of the first type, and/or when a plurality of component carriers in at least two component carrier groups of the first type are scheduled, the transceiver is configured to: aggregate feedback information corresponding to the plurality of component carriers, and feed back the aggregated feedback information to the network device over one component carrier.

In a possible design, the transceiver 1201 further reports information about a first capability to the network device before receiving the first grouping configuration information sent by the network device, and the information about the first capability is used to notify the network device that the terminal supports carrying of the control information corresponding to the first component carrier on the second component carrier.

In a possible design, at least two component carriers included in the component carrier group of the first type have a same subcarrier spacing or time unit length; or at least two component carriers included in the component carrier group of the first type have a maximum of two different subcarrier spacing or time unit length configurations.

In a possible design, the information about the first capability is further used to indicate a difference between a component carrier configuration parameter of the first component carrier and a component carrier configuration parameter of the second component carrier that are supported by the terminal.

In a possible design, the transceiver 1201 further receives second grouping configuration information sent by the network device, and the second grouping configuration information is used to indicate a grouping result of at least one component carrier group of the second type; and the transceiver 1201 further sends feedback information corresponding to each component carrier in each component carrier group of the second type to the network device over a primary component carrier or any component carrier in the component carrier group of the second type.

In a possible design, there is an intersection set between each component carrier group of the first type and at least one component carrier group of the second type.

In a possible design, when one component carrier group of the second type includes a plurality of component carrier groups of the first type, and at least two component carriers in the plurality of component carrier groups of the first type are scheduled, the transceiver 1201 sends aggregated feedback information corresponding to the at least two component carriers to the network device over a primary component carrier or any component carrier in the component carrier group of the second type, where the aggregated feedback information is feedback information fed back by the processor to the network device by using the transceiver after the processor aggregates feedback information corresponding to the at least two component carriers.

In conclusion, the network device groups the component carriers configured for the terminal into the at least one component carrier group of the first type, and a component carrier group grouped based on cross-component carrier feedback and a component carrier group grouped based on cross-component carrier scheduling are decoupled, so that component carrier aggregation scheduling performed by the network device under aggregation of component carriers including different numerologies can be simplified, a quantity of required processes can be reduced, timing value indication complexity can be reduced, and blind detection overheads can be reduced. In addition, the terminal can aggregate the feedback information corresponding to the component carriers in the at least two component carrier groups of the first type and feed back the aggregated feedback information over a same component carrier. Therefore, a limitation on a terminal power can be avoided.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams, and a combination of a process and/or a block in the flowcharts and/or the block diagrams. These computer program instructions may be provided to a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

These computer program instructions may also be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to embodiments of this application without departing from the spirit and scope of this application. This application is intended to cover these modifications and variations provided that they fall within the scope of protection defined by the following claims and their equivalent technologies.

What is claimed is:

1. A method, comprising:
    grouping, by a network device, a first plurality of component carriers configured for a terminal into at least one component carrier group of a first type, wherein the network device sends control information corresponding to a first component carrier to the terminal over a second component carrier, wherein the first component carrier and the second component carrier belong to a same component carrier group of the at least one component carrier group of the first type, and when a second plurality of component carriers comprised in at least two component carrier groups of the at least one component carrier group of the first type are scheduled, the terminal aggregates feedback information corresponding to the second plurality of component carriers and feeds back the aggregated feedback information to the network device over one component carrier;
    sending, by the network device, first grouping configuration information to the terminal, wherein the first grouping configuration information indicates a grouping result of the at least one component carrier group of the first type;
    grouping, by the network device, a third plurality of component carriers configured for the terminal into at least one component carrier group of a second type, wherein the terminal sends feedback information corresponding to each component carrier in the at least one component carrier group of the second type to the network device over a primary component carrier or one component carrier in the at least one component carrier group of the second type, and wherein there is an intersection set between each component carrier group of the at least one component carrier group of the first type and the at least one component carrier group of the second type; and
    sending, by the network device, second grouping configuration information to the terminal, wherein the second grouping configuration information indicates a grouping result of the at least one component carrier group of the second type.

2. The method according to claim 1, wherein before grouping, by the network device, the first plurality of component carriers configured for the terminal into the at least one component carrier group of the first type, the method further comprises:
    receiving, by the network device, information about a first capability that is reported by the terminal, wherein the information about the first capability notifies the network device that the terminal supports carrying of control information corresponding to the first component carrier on the second component carrier.

3. The method according to claim 2, wherein the information about the first capability indicates a difference between a component carrier configuration parameter of the first component carrier that is supported by the terminal and a component carrier configuration parameter of the second component carrier that is supported by the terminal, wherein the component carrier configuration parameter of the first component carrier and the component carrier configuration parameter of the second component carrier are subcarrier spacings or time unit lengths; and
    wherein grouping, by the network device, the first plurality of component carriers configured for the terminal into the at least one component carrier group of the first type comprises:
        grouping, by the network device based on the information about the first capability, the first plurality of component carriers configured for the terminal into the at least one component carrier group of the first type.

4. The method according to claim 1, wherein:
at least two component carriers comprised in the at least one component carrier group of the first type have a same subcarrier spacing or time unit length; or
at least two component carriers comprised in the at least one component carrier group of the first type have a maximum of two different subcarrier spacing or time unit length configurations.

5. The method according to claim 1, further comprising:
when one component carrier group of the at least one component carrier group of the second type comprises a plurality of component carrier groups of the first type, and at least two component carriers in the plurality of component carrier groups of the first type are scheduled, receiving, by the network device, aggregated feedback information corresponding to the at least two component carriers over a primary component carrier or one component carrier in the at least one component carrier group of the second type, wherein the aggregated feedback information is feedback information fed back by the terminal to the network device after the terminal aggregates feedback information corresponding to the at least two component carriers.

6. A method, comprising:
receiving, by a terminal, first grouping configuration information sent by a network device, wherein the first grouping configuration information indicates a grouping result of at least one component carrier group of a first type;
receiving, by the terminal, control information corresponding to a first component carrier that is sent by the network device over a second component carrier, wherein the first component carrier and the second component carrier belong to a same component carrier group of the at least one component carrier group of the first type;

when a first plurality of component carriers in at least two component carrier groups of the at least one component carrier group of the first type are scheduled, aggregating, by the terminal, feedback information corresponding to the first plurality of component carriers, and feeding back the aggregated feedback information to the network device over one component carrier;

receiving, by the terminal, second grouping configuration information sent by the network device, wherein the second grouping configuration information indicates a grouping result of at least one component carrier group of a second type, and wherein there is an intersection set between each component carrier group of the at least one component carrier group of the first type and the at least one component carrier group of the second type; and sending, by the terminal, feedback information corresponding to each component carrier in each component carrier group of the at least one component carrier group of the second type to the network device over a primary component carrier or one component carrier in the component carrier group of the second type.

7. The method according to claim 6, wherein before receiving the first grouping configuration information sent by a network device, the method further comprises:

reporting, by the terminal, information about a first capability to the network device, wherein the information about the first capability notifies the network device that the terminal supports carrying of the control information corresponding to the first component carrier on the second component carrier.

8. The method according to claim 7, wherein the information about the first capability indicates a difference between a component carrier configuration parameter of the first component carrier that is supported by the terminal and a component carrier configuration parameter of the second component carrier that is supported by the terminal, wherein the component carrier configuration parameter of the first component carrier and the component carrier configuration parameter of the second component carrier are subcarrier spacings or time unit lengths.

9. The method according to claim 6, wherein:

at least two component carriers comprised in the at least one component carrier group of the first type have a same subcarrier spacing or time unit length; or at least two component carriers comprised in the at least one component carrier group of the first type have a maximum of two different subcarrier spacing or time unit length configurations.

10. The method according to claim 6, further comprising:

when one component carrier group of the at least one component carrier group of the second type comprises a plurality of component carrier groups of the first type, and at least two component carriers in the plurality of component carrier groups of the first type are scheduled, sending, by the terminal, aggregated feedback information corresponding to the at least two component carriers to the network device over a primary component carrier or one component carrier in the at least one component carrier group of the second type, wherein the aggregated feedback information is feedback information fed back by the terminal to the network device after the terminal aggregates feedback information corresponding to the at least two component carriers.

11. A network device, comprising:
a non-transitory memory;
a processor;
a transmitter; and
a receiver;

wherein the non-transitory memory stores a program for execution by the processor, the program including instructions for:

grouping a first plurality of component carriers configured for a terminal into at least one component carrier group of a first type, wherein control information corresponding to a first component carrier is sent to the terminal over a second component carrier, wherein the first component carrier and the second component carrier belong to a same component carrier group of the at least one component carrier group of the first type, and when a second plurality of component carriers in at least two component carrier groups of the at least one component carrier group of the first type are scheduled, the terminal aggregates feedback information corresponding to the second plurality of component carriers and feeds back the aggregated feedback information to the network device over one component carrier; and grouping a third plurality of component carriers configured for the terminal into at least one component carrier group of a second type, wherein the terminal sends feedback information corresponding to each component carrier in the at least one component carrier group of the second type to the network device over a primary component carrier or one component carrier in the at least one component carrier group of the second type, and wherein there is an intersection set between each component carrier group of the at least one component carrier group of the first type and the at least one component carrier group of the second type; and wherein the transmitter is configured to:

send first grouping configuration information to the terminal, wherein the first grouping configuration information indicates a grouping result of the at least one component carrier group of the first type; and send second grouping configuration information to the terminal, wherein the second grouping configuration information indicates a grouping result of the at least one component carrier group of the second type.

12. The network device according to claim 11, wherein the receiver is configured to:

before the first plurality of component carriers configured for the terminal are grouped into the at least one component carrier group of the first type, receive information about a first capability that is reported by the terminal, and the information about the first capability notifies the network device that the terminal supports carrying of the control information corresponding to the first component carrier on the second component carrier.

13. The network device according to claim 11, wherein:

at least two component carriers comprised in the at least one component carrier group of the first type have a same subcarrier spacing or time unit length; or at least two component carriers comprised in the at least one component carrier group of the first type have a maximum of two different subcarrier spacing or time unit length configurations.

14. A terminal, comprising:
a non-transitory memory;
a processor; and
a transceiver;
wherein the non-transitory memory stores a program for execution by the processor, the program including instructions for:
receiving, using the transceiver, first grouping configuration information sent by a network device, wherein the first grouping configuration information indicates a grouping result of at least one component carrier group of a first type;
receiving, using the transceiver, control information corresponding to a first component carrier that is sent by the network device over a second component carrier, wherein the first component carrier and the second component carrier belong to a same component carrier group of the at least one component carrier group of the first type;
when a second plurality of component carriers in at least two component carrier groups of the at least one component carrier group of the first type are scheduled, aggregate feedback information corresponding to the second plurality of component carriers, and feed back the aggregated feedback information to the network device over one component carrier using the transceiver;
receive, using the transceiver, second grouping configuration information sent by the network device, wherein the second grouping configuration information indicates a grouping result of at least one component carrier group of a second type, and wherein there is an intersection set between each component carrier group of the at least one component carrier group of the first type and the at least one component carrier group of the second type; and
send, using the transceiver, feedback information corresponding to each component carrier in each component carrier group of the at least one component carrier group of the second type to the network device over a primary component carrier or one component carrier in the component carrier group of the second type.

15. The terminal according to claim 14, wherein the program further includes instructions for:
reporting, using the transceiver, information about a first capability to the network device before receiving the first grouping configuration information sent by the network device, wherein the information about the first capability notifies the network device that the terminal supports carrying of the control information corresponding to the first component carrier on the second component carrier.

16. The terminal according to claim 14, wherein:
at least two component carriers comprised in the at least one component carrier group of the first type have a same subcarrier spacing or time unit length; or
at least two component carriers comprised in the at least one component carrier group of the first type have a maximum of two different subcarrier spacing or time unit length configurations.

* * * * *